F. J. SEYMOUR.
Machine for Washing Ores.
No. 227,589.                    Patented May 11, 1880.
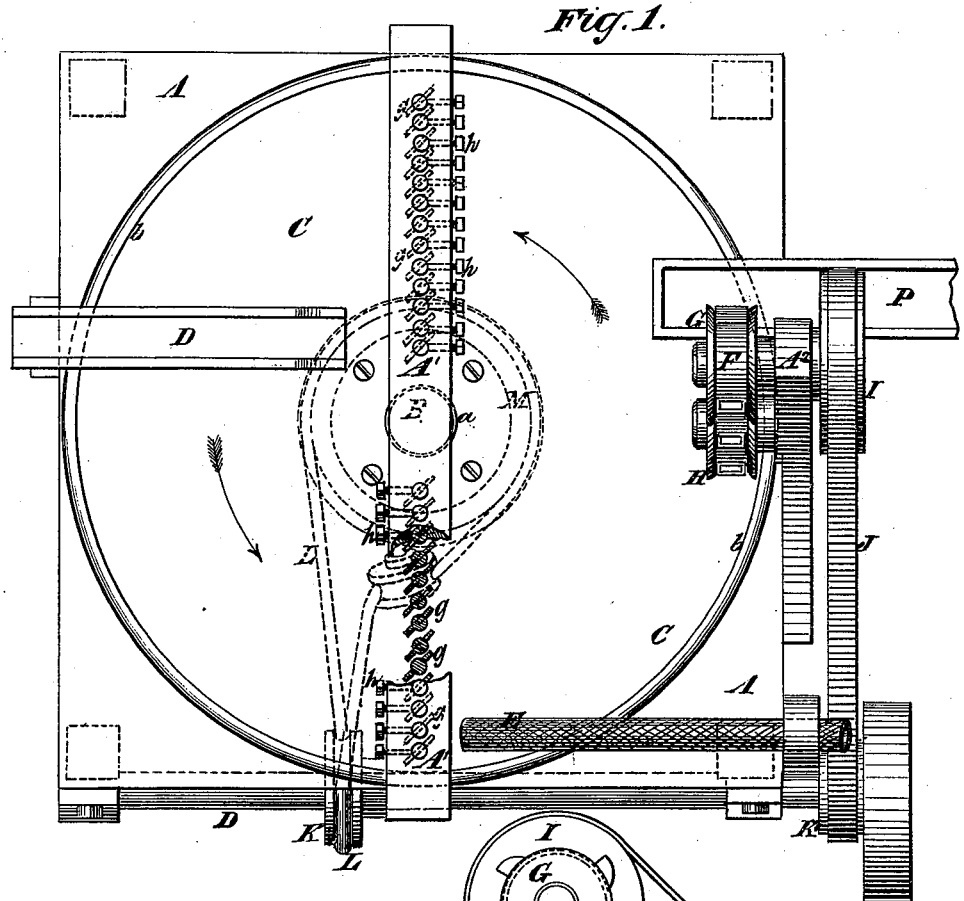
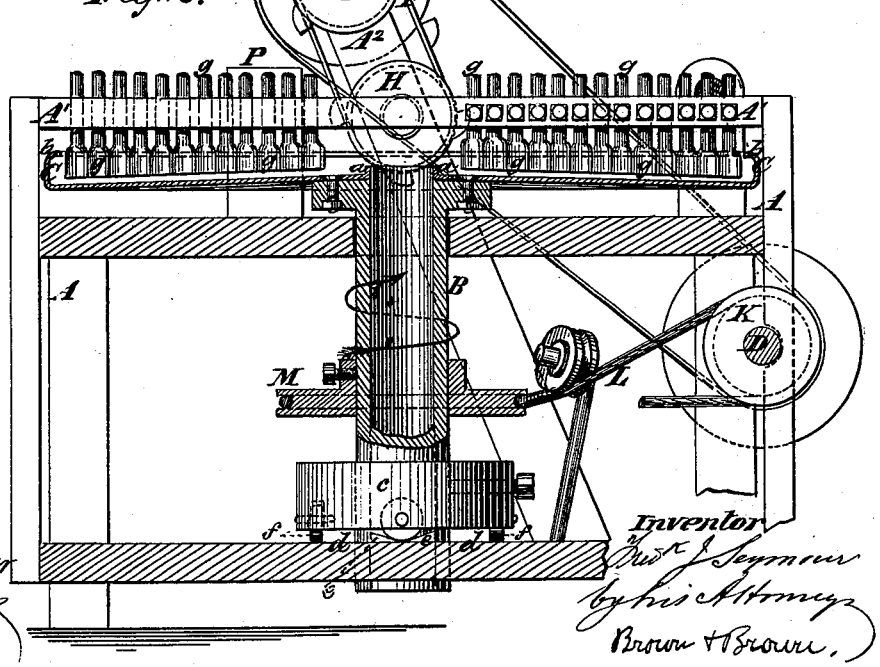

UNITED STATES PATENT OFFICE.

FREDERICK J. SEYMOUR, OF WOLCOTTVILLE, ASSIGNOR TO JOSEPH B. SPENCER, OF WATERBURY, CONNECTICUT, AND JASPAR A. VIALL, OF HELENA, MONTANA TERRITORY, ONE-FOURTH TO EACH.

MACHINE FOR WASHING ORES.

SPECIFICATION forming part of Letters Patent No. 227,589, dated May 11, 1880.

Application filed August 21, 1879.

*To all whom it may concern:*

Be it known that I, FREDERICK J. SEYMOUR, of Wolcottville, in the county of Litchfield and State of Connecticut, have invented certain new and useful Improvements in Machinery for Washing and Concentrating Ores and other Substances; and I hereby declare that the following is a description of the same, reference being had to the accompanying drawings, forming part of this specification.

An important object of this invention is to provide for the washing and concentration of those auriferous ores of low grade existing in large quantities as it has heretofore been impracticable to reduce with profit without concentration and difficult to concentrate by any of the previously-known machines or processes; but the invention may also be used with advantage for the washing and concentration of other kinds of ore, or to the separation of metals from slag, cinders, or other foreign matters, such as are or may be present with them after various metallurgical operations, or from any foreign matters which may exist with them in a state of nature.

The invention consists in the combination, with a rotary pan having a hollow shaft and central overflow-opening and a downward inclination from the said opening to its outer circumference, of means of imparting to said pan a jumping motion.

It also consists in the combination, with a rotary pan having a hollow shaft and central overflow-opening, of a series of stirring or agitating blades so obliquely arranged in the said pan that their faces, toward which the pan rotates, are presented toward the axes of the pan in such manner that the said blades have a tendency to direct the water and contents of the pan toward the center thereof in opposition to the centrifugal force developed by the rotary motion of the pan.

The blades above mentioned are preferably adjustable to vary their obliquity.

The invention further consists in the combination, with a rotary pan having a central overflow-opening, of an elevator arranged over and within the said pan and its outer circumference.

Figure 1 in the drawings is a plan of a machine embodying my invention. Fig. 2 is a vertical section of the same.

A is the framing of the machine, in which is arranged, in suitable bearings, an upright hollow shaft, B, which is open at the top and bottom, and to the top or upper part of which is secured the concentrating-pan C, which is of wrought or cast iron, or of copper, of circular form, with an opening in the center surrounded by an upwardly-projecting inner rim, a, and an upwardly-projecting outer rim, b, which may be slightly turned inward, as shown in Fig. 2. This pan may be of about eight feet external diameter and have a central opening of about six inches diameter, and may have its outer rim about fourteen inches high, its inner rim about four inches high, and its bottom inclined downward about three inches from the inner to the outer rim. The inner rim, a, may be surrounded by a rim of wire-cloth about six inches higher, and of a mesh about forty to the inch.

The lower part of the shaft B is surrounded, as shown in Fig. 2, by a solid collar or flange, c, to which are fitted two or more anti-friction rollers, f f, which bear upon a solid step, d, upon which there are two or more abruptly-terminating inclined upward projections, e e. The open bottom of the said shaft projects downward through the step. A continuous rotary motion is imparted to the said shaft by a belt, L, and pulleys K M, as shown, with a horizontal driving-shaft, D, for the purpose of giving continuous rotary motion in one direction to the shaft A and pan C, which are also caused at the same time to receive a jumping motion by reason of the anti-friction rollers f f running up and dropping over the inclined projections e e on the step d.

Across the upper part of the framing A, and extending right across the concentrating-pan C, there is a stationary bar, A', in which are secured a number of agitators, g g, which dip into the pan to such depth as to permit the free rotation and also the jumping motion thereof without their touching its bottom. These agitators have broad thin blades, and have straight shanks, which are fitted and secured by set-screws $h\ h$ into holes provided for them in the bar A′ in such manner as to permit of their being turned to adjust the blades separately in any suitable direction. These blades should be so adjusted that they present themselves obliquely to the radius of the pan, as shown in Fig. 1, their obliquity being such relatively to the direction of the rotary motion of the pan, which is indicated by an arrow in Fig. 2, that their faces—that is to say, the sides toward which the pan rotates—present themselves inward or toward the axis of the pan and shaft, so that when rotary motion is given to the pan the ore and water contained therein may, on striking the said blades, glance off toward the center of the pan, the said agitators consequently having a tendency to more or less counteract the effect of centrifugal force on the contents of the pan. The blades $g$ should also be arranged so as to overlap each other, whereby they act upon all the material contained in the pan.

D is a spout through which the ore or other substance to be concentrated or washed is fed to the pan.

E is a pipe for the introduction of water to the pan when necessary. F is an elevator, consisting of an endless band or chain and attached buckets so arranged within the pan as to be capable of taking up the contents of the pan from near the outer rim thereof and delivering them into a discharge-spout, P, arranged over the edge of the pan. This elevator runs on two pulleys, G H, the shafts of which run in bearings in a standard, A², on the framing A, the upper of the said shafts being furnished with a pulley, I, through which it receives motion from a band, J, and a pulley, K′, on the shaft D.

The operation of the machine is as follows: Ore or other material to be concentrated or washed being fed into the pan by the spout D, together with water, and a further supply of water being also, when desirable, introduced by the pipe E, while a horizontal rotary motion is given to the pan in the direction of the arrows shown in Fig. 1, the contents of the pan are subject to the action of centrifugal force; but the action of this force is somewhat counteracted or retarded by the effect of the agitators $g\ g$, which have a tendency to divert both the solid matters and the water toward the center of the pan, keeping them, as it were, in a measure suspended between two forces—centrifugal and centripetal—and also in such a state of agitation that the solid matters are held more or less in a state of suspension in the water, by the constant overflow of which over the rim $a$ at the center of the pan, which is its only outlet, the lighter matters are carried off through the hollow shaft, while the heavier matters, being more influenced by the centrifugal force, are caused to pass toward the outer circumference of the pan, whence they may be removed continually by the elevator F or some equivalent device, or periodically by any convenient means.

The separation of the heavier and lighter matters is further aided by the jumping motion which is given to the pan in its revolution by the inclined projections $e\ e$ on the step $d$, and which assists in the separation of the heavier and lighter particles by gravitation, the heavier falling to the bottom of the pan, the outward and downward inclination of which assists the centrifugal force in causing the heavier and concentrated material to pass toward the outer circumference of the pan.

It may be observed that the ore and water while kept agitated in a thin stratum are so treated that the heavier portion of the ore, which it is desirable to save, is separated from the water by being caused to move in one direction, while the water and the lighter portion of the ore are caused to pass in an opposite direction.

The successful operation of the agitators or blades $h\ h$ depends on a proper relation between their obliquity and the velocity of rotation of the pan, a higher velocity of the pan requiring the said blades to be set more nearly coincident with the circles described by the rotation of the pan. It may be desirable to set the several blades at different degrees of obliquity, so that those farther from or nearer to the center of the pan may be more or less nearly coincident with the circles described by the pan, according to the varying degree of centrifugal force developed at the different distances from the center at which they operate.

The concentrating-pan, if made of copper, may be coated internally with quicksilver, for the purpose of capturing any free gold or silver that may be contained in the ore.

A sufficient quantity of quicksilver may be kept in the pan to float the bulk of the ore or material under operation.

I do not claim, broadly, either a rotary pan with a hollow shaft, a rotary pan with a central overflow, or a rotary pan having a jumping motion; but

I claim—

1. In a machine for concentrating, amalgamating, or washing ore and other substances, the combination of a pan having an upright shaft through which is a central overflow-opening, and constructed with a downward inclination from the central opening toward the circumference, with a driving-pulley for imparting a continuous rotary motion to the shaft and pan, and an inclined projection and anti-friction roller for imparting a jumping motion to the same, all substantially as herein described.

2. The combination, in a machine for concentrating or washing ores or mineral substances, of a pan having a hollow central shaft open at the top for a central overflow, a driving-pulley for imparting a continuous rotary motion to said shaft and pan, and a series of stirring or agitating blades arranged within the said pan oblique to the radius thereof, and with their oblique faces, toward which the pan rotates, presented toward the axis of the pan and shaft, said combination being and operating substantially as herein shown and described.

3. The combination, with a washing, amalgamating, or concentrating pan, having a central shaft provided with a central opening and the driving-pulley for imparting a continuous rotary motion to said shaft and pan, of agitating-blades having their faces oblique to the radius of the pan, as hereinabove described, and separately adjustable to vary the obliquity of each relatively to that of the others, substantially as herein set forth.

4. The combination, with a rotary washing or concentrating pan having a central overflow, and having its bottom inclined downwardly and outwardly from said opening, of an elevator arranged over and within that portion of the pan near its periphery or outer circumference, substantially as herein described.

FREDK. J. SEYMOUR.

Witnesses:
HENRY T. BROWN,
FREDK. HAYNES.